(12) United States Patent
Peisert et al.

(10) Patent No.: US 7,820,117 B2
(45) Date of Patent: Oct. 26, 2010

(54) SYSTEM FOR SECURING THE END CONE OR MOUNTING MAT OF A POLLUTION CONTROL DEVICE

(75) Inventors: Joseph C. Peisert, St. Paul, MN (US);
Kevin Kaczorek, Mahtomedi, MN (US);
Ian R. Harding, Mahtomedi, MN (US);
Carl J. Braunreiter, Prescott, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 1119 days.

(21) Appl. No.: 10/543,668

(22) PCT Filed: Jan. 29, 2004

(86) PCT No.: PCT/US2004/002374

§ 371 (c)(1),
(2), (4) Date: May 11, 2006

(87) PCT Pub. No.: WO2004/070176

PCT Pub. Date: Aug. 19, 2004

(65) Prior Publication Data

US 2006/0286014 A1 Dec. 21, 2006

(51) Int. Cl.
*B01D 50/00* (2006.01)
(52) U.S. Cl. ..................................................... 422/179
(58) Field of Classification Search .................. 422/168, 422/179, 177, 180
See application file for complete search history.

(56) References Cited

U.S. PATENT DOCUMENTS

| | | | |
|---|---|---|---|
| 4,305,992 A | 12/1981 | Langer et al. | |
| 4,863,700 A | 9/1989 | Ten Eyck | |
| 4,999,168 A | 3/1991 | Ten Eyck | |
| 5,380,580 A | 1/1995 | Rogers et al. | |
| 5,585,312 A | 12/1996 | Ten Eyck et al. | |
| 5,686,039 A | 11/1997 | Merry | |
| 6,162,404 A | 12/2000 | Tojo et al. | |
| 6,231,818 B1 | 5/2001 | TenEyck | |
| 6,245,301 B1 | 6/2001 | Stroom et al. | |

FOREIGN PATENT DOCUMENTS

| | | |
|---|---|---|
| EP | 0 525 251 A | 3/1993 |
| EP | 1 314 866 A2 | 5/2003 |
| JP | 2000-240439 | 9/2000 |
| WO | WO 98/50688 | 11/1998 |
| WO | WO 00/11098 A | 3/2000 |
| WO | WO 00/75496 A1 | 12/2000 |
| WO | WO 03/078064 A | 9/2003 |

*Primary Examiner*—Tom Duong
(74) *Attorney, Agent, or Firm*—Harold C. Knecht, III

(57) ABSTRACT

A thin-walled structure (e.g., an end cone insulator (12) and/or a mounting mat) (12) comprising insulating material suitable for insulating portions (e.g., an end cone) of a pollution control device (16) and/or mounting material suitable for mounting a pollution control element in a pollution control device (16) (e.g., a catalytic element in a catalytic converter, a filter element in a diesel or gasoline engine exhaust filter, etc.). The thin-walled structure can comprise an insulating material and/or mounting material in the form, for example, of a sheet, mat (12) or three-dimensional thin walled structure (e.g., a single piece or multiple piece three dimensional end cone insulator). (12) An intermediate adhesive (18) (e.g., a heat activated adhesive, hot melt adhesive and/or adhesive-like thermoplastic material) is bonded to at least one major surface of the thin-walled structure so as to coat and penetrate into the at least one major surface. The intermediate adhesive (18) at least mechanically bonds to the thin-walled structure. A pressure sensitive (20) adhesive is bonded to the intermediate adhesive (18) and used to secure the thin-walled structure in place in the pollution control device (16).

19 Claims, 1 Drawing Sheet

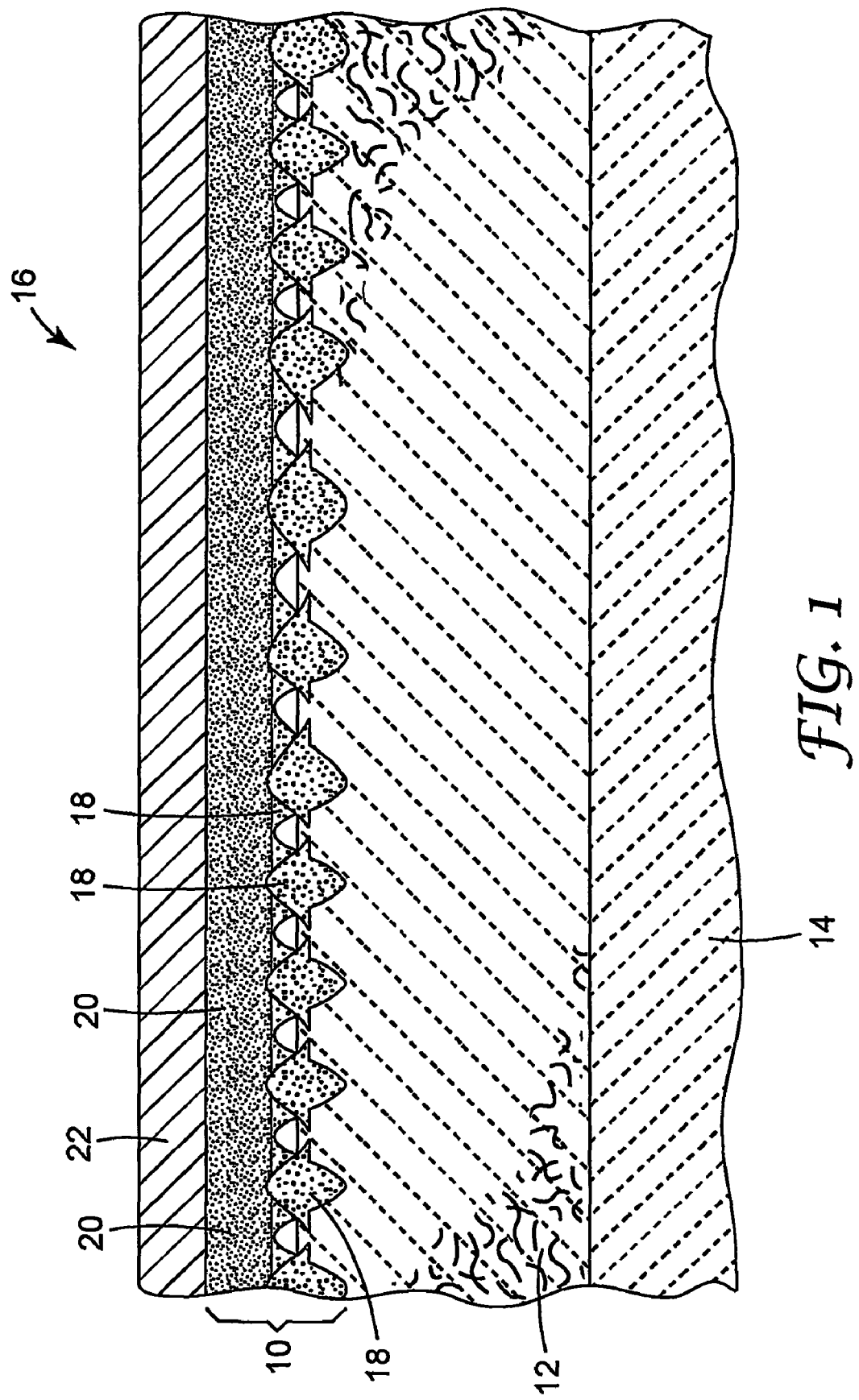

SYSTEM FOR SECURING THE END CONE OR MOUNTING MAT OF A POLLUTION CONTROL DEVICE

FIELD OF THE INVENTION

The present invention relates to pollution control devices used in the exhaust systems of internal combustion engines, more particularly, to the systems used to mount and/or insulate a pollution control element in the pollution control device and, even more particularly, the constructions and techniques used to secure portions or all of such mounting and/or insulating systems in place during the assembly of such pollution control devices. The present invention also relates to methods of assembling such pollution control devices that include the use of such securing constructions and/or techniques.

BACKGROUND

Conventional pollution control devices (e.g., catalytic converters, exhaust filters, and the like) are used in the exhaust systems of internal combustion engines such as, for example engines used in various vehicles (e.g., automobiles, watercraft, aircraft, etc.), power generators and the like. Such pollution control devices have typically employed a variety of insulation materials and mounting materials. These materials are typically made using ceramic fibers, intumescent particles or combinations thereof. Such materials have been used in the form of end cone insulators, like that disclosed in PCT Application No. PCT/US97/15864 (Publication No. WO 98/50688), and in the form of mounting mats, like that disclosed in U.S. Pat. Nos. 4,305,992; 4,999,168 and 6,245,301. In addition to the various materials that are used, a number of techniques have been employed to assemble such insulators and mats into pollution control devices.

There is a continuing need for improvements in the ways that pollution control devices are assembled.

SUMMARY

One such need that has been identified is for a better way to secure the insulating materials and/or mounting materials in place during the assembly of the pollution control device. The present invention is directed to satisfying this need, at least in part. It can be desirable to secure such conventional insulating material, or mounting material, at a desired location inside of a pollution control device. When a pressure sensitive adhesive (PSA) is used to secure such materials inside of the pollution control device, the bond between the PSA and the insulating or mounting material can be insufficient for keeping the material in place. When the insulating or mounting material comprises fibers, it has been found that such an insufficient bond is more likely to be formed when very short fibers (e.g., about 5 mm or less) are used and/or low amounts of, or no, organic binder is used. It has also been found that such an insufficient bond is less likely when long entangled fibers are used in combination with higher amounts of organic binder.

It has further been found that this problem can be avoided by using an intermediate heat activated or hot melt adhesive, or adhesive-like thermoplastic material, between the insulating material or mounting material and the PSA.

In one aspect of the present invention, a thin-walled structure (e.g., an end cone insulator and/or a mounting mat) is provided that comprises insulating material suitable for insulating portions (e.g., an end cone) of a pollution control device and/or mounting material suitable for mounting a pollution control element in a pollution control device (e.g., a catalytic element in a catalytic converter, a filter element in a diesel or gasoline engine exhaust filter, etc.). The thin-walled structure can comprise an insulating material and/or mounting material in the form, for example, of a sheet, mat or three-dimensional thin walled structure (e.g., a single piece or multiple piece three dimensional end cone insulator). An intermediate adhesive (e.g., a heat activated adhesive, hot melt adhesive and/or adhesive-like thermoplastic material) is bonded to at least one major surface of the thin-walled structure so as to coat and penetrate into the at least one major surface. The intermediate adhesive at least mechanically bonds to the thin-walled structure. It can be desirable for the intermediate adhesive to chemically bond to the thin-walled structure, in addition to or as an alternative to mechanical bonding. A pressure sensitive adhesive is bonded to the intermediate adhesive.

The insulating material and/or mounting material can comprise intumescent materials and/or non-intumescent materials. The non-intumescent materials typically include inorganic fibers such as, for example, ceramic fibers. The ceramic fibers can be refractor ceramic fibers. The intumescent materials typically include, for example, vermiculite and other such materials. An organic binder can be used to hold the inorganic fibers together and maintain the thin-walled structure, for example, an end cone insulator or mounting mat, in a highly dense and thin state.

In another aspect of the present invention, a pollution control device is provided that includes an end cone insulator and/or a mounting mat comprising the above thin-walled structure.

In further aspect of the present invention, an exhaust system for an internal combustion engine, with or without the internal combustion engine, is provided that comprises the above pollution control device.

In an additional aspect of the present invention, a method of making a pollution control device is provided that includes the use of the above end cone insulator and/or mounting mat and comprises securing the end cone insulator and/or mounting mat in the pollution control device by using an intermediate heat activated or hot melt adhesive, or adhesive-like thermoplastic material, between the end cone insulator, mounting mat or other thin-walled structure and a pressure sensitive adhesive, where the PSA is used to bond the end cone insulator and/or mounting mat in place in the pollution control device.

BRIEF DESCRIPTION OF THE DRAWINGS

FIG. 1 is a diagrammatic cross-sectional view of an exemplary securing system used in a pollution control device according to the present invention.

DETAILED DESCRIPTION

Although the present invention is herein described in terms of specific embodiments, it will be readily apparent to those skilled in this art that various modifications, re-arrangements, and substitutions can be made without departing from the spirit of the invention.

Referring to FIG. 1, an exemplary securing system 10 according to the present invention is shown that can be used to secure an end cone insulator 12 between an inner end cone housing 14 and an outer end cone housing 22 of a pollution control device 16 (e.g., catalytic converters, engine exhaust filters, and the like) used in the exhaust system of an internal combustion engine (e.g., engines used in automobiles, power generators, watercraft, aircraft and the like). The securing system 10 is particularly useful, though not exclusively, for securing each piece of a two piece end cone insulator 12 (e.g., clam shell halves) in place to one or the other of inner housing 14 and outer housing 22, especially when the end cone insulator 12 is not symmetrical (e.g., not symmetrical around the axis of exhaust flow through the end cone. When the end cone insulator 12 is not symmetrical (i.e., when the end cone housings 14 and 22 are not symmetrical), the positioning of the end cone insulator 12 within the housing 14 and 22 can be critical to insuring that the end cone portion of the pollution control device 16 is assembled properly. A misalignment between the end cone insulator 12 and the end cone housings 14 and 22 can result in the end cone portion of the pollution control device 16 having to be reassembled or, in some cases, scrapped.

The securing system 10 can also be used to secure a mounting mat 12, for example, in position on the inside surface of a housing 22 (e.g., a clam-shell type housing) so as to allow a pollution control element 14 (e.g., a catalytic element, a diesel or gasoline engine filter element, etc.) to be mounted in the pollution control device 16, with the mat 12 being between the housing 22 and the element 14.

The system 10 includes one or more layers of an intermediate adhesive 18 (e.g., a heat activated adhesive, hot melt adhesive and/or adhesive-like thermoplastic material) bonded to at least one major surface of the end cone insulator and/or mounting mat 12 so as to completely, or at least substantially, coat the at least one major surface and penetrate into the end cone insulator or the mounting mat 12. Hot melt adhesives may be pressure-sensitive or heat activated, i.e., non-tacky at room temperature. Hot melt adhesives can also be thermoplastic (i.e., remeltable) or thermosetting compositions. One or more layers of a pressure sensitive adhesive (PSA) 20 are bonded to the intermediate adhesive 18, with or without a Film, scrim, woven or non-woven fabric, etc., either sandwiched therebetween or on top of the PSA layer(s) 20. If the film, scrim, woven or non-woven fabric, etc. is on top of the PSA layer(s) 20, then one or more other PSA layers 20 are used to secure the end cone insulator or mounting mat 12 inside of the pollution control device 16, for example, by bonding the PSA 20 to the inside surface of the housing (e.g., a metal can) portion 22 of the device 16. The polymeric scrim, woven or non-woven fabric or film can be made, for example, from polyethylene, polyester, nylon, etc.

The end cone insulator and/or mounting mat 12 can comprise non-intumescent materials (e.g., inorganic fibers) and/or intumescent materials in the form of a sheet, mat or any other such thin-walled structure. The inorganic fibers can be ceramic fibers. The ceramic fibers can be refractor ceramic fibers. An organic binder can be used to hold the inorganic fibers together and maintain the end cone insulator or mounting mat 12 in a highly dense and thin state. Examples of inorganic fiber containing sheets suitable for use in insulating and/or mounting applications in a pollution control device 16 include, for example, the ceramic fiber sheets or layers disclosed and taught in U.S. Pat. Nos. 5,380,580 and 4,863,700, and PCT Published Patent Application No. WO 00/75496 A1, each of which is incorporated herein by reference in its entirety.

Examples of end cone insulators can be found in PCT Application No. PCT/US97/15864 (Publication No. WO 98/50688), which is herein incorporated by reference in its entirety. Examples of mounting mats can be found in U.S. Pat. Nos. 4,305,992; 4,999,168 and 6,245,301, which are herein incorporated by reference in their entirety.

Intermediate adhesives may be any type suitable for coating and penetrating the mounting mat or end cone insulator. Pressure-sensitive adhesives may be of any type suitable for attaching to the applicable surfaces of the pollution control device (e.g., the inside surface of its housing at the end of the device or adjacent to the pollution control element, or on the outer surface of the pollution control element). Examples of pressure-sensitive adhesives (PSAs) include acrylic PSAs, tackified block copolymer PSAs, polyurethane PSAs, ethylene vinyl acetate PSAs, and the like. Suitable pressure-sensitive adhesives may include both water based adhesives, e.g. latex, and solvent based adhesives. The intermediate adhesive may be sprayed on or otherwise applied (e.g., brushed on), or supplied as a film, woven or non-woven web, etc. and laminated to the mounting mat or end cone insulator. The PSA may be sprayed on, or supplied as a transfer adhesive or double coated tape and laminated to the intermediate adhesive. Adhesive transfer tapes are available from 3M Company under the 3M™ trade designation under the product numbers such as Adhesive Transfer Tape 468MP, Adhesive Transfer Tape 468MPF, Adhesive Transfer Tape 966, and the like.

There can be a number of advantages to having a polymeric film, scrim or other layer applied so as to bond to one side of the insulation material and/or mounting material. One or more of the following exemplary advantages can apply: improved handling strength of the insulation material and/or mounting material, improved tear resistance of the insulation material and/or mounting material, reduced coefficient of friction so as to make it easier to mount and install the pollution control element and assemble the pollution control device, the ability to apply a pressure sensitive adhesive (PSA) tape to the surface of the insulation material and/or mounting material (e.g., to keep the sheet of end cone insulation material in an end cone or conical shape).

EXAMPLE 1

An example of this invention can be made using a layer of fibrous insulating sheet material (e.g., the 900HT ceramic fiber sheet material manufactured by 3M Company), with a major surface of a cast polypropylene film being bonded to a major surface of the sheet material by an intermediate adhesive layer, provided by a non-woven thermoplastic web manufactured by Bostik under the product designation PE-65. The intermediate adhesive layer is sandwiched between and bonded to the major surface of the sheet material and of the polymeric film. The adhesive layer was heated and allowed to penetrate into the major surface of the sheet material. In making this structure, the sheet material was placed on the bottom, the PE-65 in the middle and polymeric film on top. This construction was then passed through a hot roll laminator with sufficient heat to melt the thermoplastic web without damaging the polymeric film. The resulting laminate had a strong film to insulation bond. 180 degree peel tests separating the film from the insulation showed a 4 to 5 times increase compared to the use of a PSA to bond the polymeric film to the sheet material.

EXAMPLE 2

The same construction as that in Example 1 except that the polypropylene film is backed with a PSA that bonds well to the Bostik PE-65 and the construction is laminated with the PSA side of the film being bonded to the intermediate adhesive layer.

EXAMPLE 3

Another example of the present invention can be formed using a hot melt adhesive (Bostik Polyester 105 Web Adhesive available from Bostik Corp.) as the intermediate adhesive. This adhesive web is was placed over a conventional ceramic fiber-based mounting mat and heated so the adhesive is between about 110-140° C. A spun bonded nylon non-woven scrim having a thickness of about 0.1 mm and a basis weight of 85 ounces/yard$^2$ (available under the Cerex trade designation) is laminated to the heated adhesive web using a nip roll to provide a surface on the mat for anchoring a pressure-sensitive adhesive. A pressure-sensitive adhesive transfer tape is adhered to the nylon scrim to provide an insulating mat according to the present invention.

EXAMPLE 4

An additional example of the present invention can be made using a layer of fibrous material (e.g., the 900HT ceramic fiber sheet material manufactured by 3M Company), with a major surface of a cast polypropylene film, backed with a low adhesion backing, being bonded to a major surface of the sheet material by an intermediate adhesive layer, provided by a non-woven thermoplastic web manufactured by Bostik under the product designation PE-65-50 (having a basis weight of 50 g/m$^2$). The intermediate adhesive layer is sandwiched between and bonded to the major surface of the sheet material and of the polymeric film. The adhesive layer was heated and allowed to penetrate into the major surface of the sheet material. In making this structure, the sheet material was placed on the bottom, the PE-65-50 Bostik adhesive was in the middle and the polymeric film on top. This construction was then passed through a hot roll laminator with sufficient heat to melt the thermoplastic web without damaging the polymeric film. One adhesive side (i.e., major surface) of a double-sided 300LSE high strength transfer adhesive tape, manufactured by 3M Company under the product number 9671LE and suitable for adhesion to oily/non-oily metal surfaces, was then applied and bonded to the polymeric film. The other adhesive side (i.e., major surface) of the transfer tape was protected with a paper release liner. In order to adhere the fibrous sheet material to the inside surface of a pollution control device housing, the release liner is removed and the other adhesive side is applied to the inside surface of the housing.

What is claimed is:

1. A system for use in a pollution control device, said system comprising:
   a thin-walled structure comprising a material comprising fiber, with said material being suitable for use in a pollution control device;
   an intermediate adhesive bonded to at least one major surface of said thin-walled structure so as to coat said at least one major surface and penetrate into said material so as to at least mechanically bond to said thin-walled structure; and
   a pressure sensitive adhesive bonded to said intermediate adhesive, opposite said thin-walled structure,
   wherein said intermediate adhesive is one or more of a heat activated adhesive, hot melt adhesive, adhesive-like thermoplastic material or a combination thereof.

2. The system according to claim 1, wherein said system is an insulator suitable for insulating a portion of a pollution control device.

3. A pollution control device comprising said system according to claim 2.

4. The system according to claim 1, wherein said system is an insulator suitable for insulating an end cone of a catalytic converter, a diesel engine exhaust filter assembly, or a gasoline engine exhaust filter assembly.

5. The system mat according to claim 1, wherein said system is a mounting mat suitable for mounting a pollution control element in a pollution control device.

6. A pollution control device comprising said system according to claim 5.

7. The system mat according to claim 1, wherein said system is a mounting mat suitable for mounting a catalytic element in a catalytic converter, a filter element in a diesel engine exhaust filter assembly, or a filter element in a gasoline engine exhaust filter assembly.

8. The system according to claim 1, wherein said material further comprises an intumescent material.

9. The system according to claim 1, wherein said system is a non-intumescent system.

10. A pollution control device comprising said system according to claim 9.

11. The system according to claim 1, wherein said pressure sensitive adhesive is bonded to said intermediate adhesive with a film, scrim, woven fabric, or non-woven fabric either sandwiched therebetween or on top of said pressure sensitive adhesive.

12. A pollution control device comprising said system according to claim 11.

13. The system according to claim 1, wherein said material comprises fibers having a length of about 5 mm or less.

14. A pollution control device comprising said system according to claim 1.

15. An exhaust system for an internal combustion engine, said exhaust system comprising said pollution control device according to claim 14.

16. An internal combustion engine comprising said exhaust system according to claim 15.

17. A vehicle comprising the internal combustion engine according to claim 16.

18. A method of making a pollution control device comprising:
   providing a system according to claim 1;
   providing a housing for the pollution control device; and
   securing the system in place in the pollution control device by using the pressure sensitive adhesive to bond the thin-walled structure to an inner surface of the housing.

19. A method of making a system according to claim 1, wherein the pressure sensitive adhesive is bonded to the intermediate adhesive with a polymeric film either sandwiched therebetween or on top of the pressure sensitive adhesive so as to form a construction, and said method comprises:
   passing the construction through a hot roll laminator with enough heat to sufficiently melt the intermediate adhesive to cause the intermediate adhesive to bond to at least one major surface of the thin-walled structure so as to coat the at least one major surface and penetrate into the material so as to at least mechanically bond to the thin-walled structure, without damaging the polymeric film.

* * * * *